United States Patent [19]

Haidinger et al.

[11] 3,991,171
[45] Nov. 9, 1976

[54] DEHYDRATION OF ALUMINUM FLUORIDE HYDRATES

[75] Inventors: Franz Haidinger; Helmuth Fingrhut, both of Linz (Danube); Franz Jenatschek, Leonding near Linz (Danube), all of Austria; Arankathu Skaria, Zurich, Switzerland

[73] Assignee: Chemie Linz Aktiengesellschaft, Linz, Austria

[22] Filed: Feb. 11, 1975

[21] Appl. No.: 549,035

Related U.S. Application Data

[63] Continuation-in-part of Ser. No. 286,301, Sept. 5, 1972, abandoned.

[30] Foreign Application Priority Data

Sept. 6, 1971 Austria ............................ 7718/71
Feb. 11, 1972 Austria ............................ 1100/72

[52] U.S. Cl. ............................ 423/495; 34/22; 34/173; 34/10; 159/47 R
[51] Int. Cl.² ...................... C01B 9/08; B01D 1/00
[58] Field of Search .......... 159/47 R; 423/489, 495; 34/10, 22, 57 R, 129, 173, 186, 236

[56] References Cited

UNITED STATES PATENTS

| | | | |
|---|---|---|---|
| 2,835,050 | 5/1958 | Janetti | 34/173 |
| 3,287,823 | 11/1966 | Vidali | 34/173 |
| 3,330,046 | 7/1967 | Albertas | 34/10 |
| 3,408,745 | 11/1968 | Filippi et al. | 34/10 |
| 3,492,086 | 1/1970 | Bergen et al. | 423/489 X |
| 3,606,283 | 9/1971 | Weber | 34/57 A X |
| 3,733,714 | 5/1973 | Connor | 34/173 |

*Primary Examiner*—Wilbur L. Bascomb, Jr.
*Assistant Examiner*—Dale Lovercheck
*Attorney, Agent, or Firm*—Wenderoth, Lind & Ponack

[57] ABSTRACT

Aluminium fluoride hydrates, especially aluminium fluoride trihydrate, are dehydrated by a process involving dehydration in two sections, the first dehydration being effected in a disc dryer while observing certain process conditions and the second dehydration being effected in a fluidized bed at a temperature up to 600° C.

3 Claims, 3 Drawing Figures

DEHYDRATION OF ALUMINUM FLUORIDE HYDRATES

This is a continuation-in-part of applicants copending application Ser. No. 286,301, filed Sept. 5, 1972, now abandoned.

This invention relates to a process for the dehydration of aluminum fluoride hydrates, especially aluminium fluoride trihydrate.

In the crystallisation of aluminium fluoride from aqueous solutions, hydrates of the fluoride, above all aluminium trihydrate are obtained, and these must then be dehydrated by heating.

Dehydration by heating requires relatively high temperatures, namely of up to 600° C, and is accompanied by the difficulty that considerable losses in fluorine easily arise, above all if the product to be dehydrated is exposed for a prolonged period to an atmosphere of high water vapour content.

According to Austrian Patent Specification No. 217,009, a process for the calcination of aluminium fluoride has been developed, in which fluorine losses hardly arise and aluminium fluoride of a least 96 percent strength is obtained. This process, which preferentially employs calcination in a fluidised bed is based on bringing the aluminium fluoride to the requisite dehydration temperature within a few seconds. If the calcination is carried out in several steps, the temperature required for each step must be reached within the requisite few seconds.

The process according to Austrian Patent Specification No. 217,009 may be carried out advantageously, for example, in a fluidised bed furnace which is heated by so-called radiant sleeves, that is to say tubes equipped with gas-heated recuperator burners (U.S. Pat. No. 3,617,038). Another construction of the fluidised bed furnace described in Austrian Patent Specification No. 285,536 employs heating by means of flue gases which flow through U-shaped tubes.

All these furnace constructions are relatively expensive and not always easy to control, above all if they are designed for large plant capacities. There is therefore a need to find a technically simpler solution, above all for the dehydration of the aluminium fluoride trihydrate to the hemi-hydrate stage, which already takes place at temperatures of 200° to 300° C.

U.S. Pat. No. 3,606,283 therefore discloses a process for carrying out dehydration of the aluminium fluoride trihydrate to the monohydrate stage or hemi-hydrate stage in a highspeed dryer, for example a continuous flow dryer, with vigorous motion. Here again the dehydration takes place in a fluidised state, with the product being heated rapidly. However, the disadvantage of the continuous flow dryer is relatively severe comminution of the particles, which has to be tolerated but which makes the subsequent complete dehydration in the fluidised bed very much more difficult. In this Specification, the opinion is furthermore expressed that slow dehydration is only possible if the material is dehydrated in relatively thin, static beds, so that the water vapour which forms continuously can leave freely. However, working in a static bed is too expensive for major production quantities.

It has now been found that the dehydration of aluminium fluoride hydrates, especially of aluminium fluoride trihydrate, to achieve a water content of less than 10% corresponding to the hemi-hydrate stage, is possible in a technically simple apparatus and without having to observe the requirement that the heating-up time should be extremely short, or having to use heating in a static bed, if calcination in a disc dryer which is in itself known is employed and in doing so certain process conditions are observed.

The present invention will be briefly described in respect to the drawings.

Figure 1:
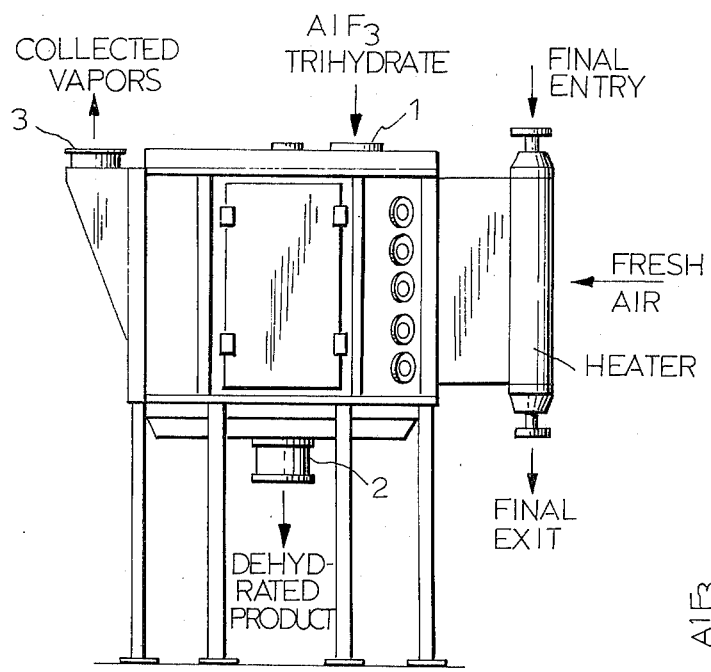
FIG. 1 is a side view of a disc dryer apparatus suitable for carrying out the present invention.
Figure 2:
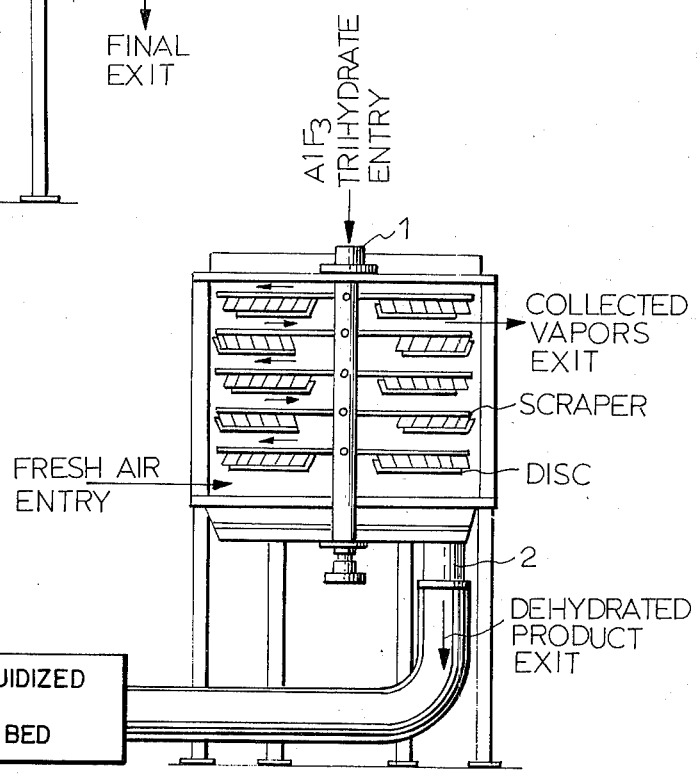
FIG. 2 is an elevational cross-sectional view of the invention including the disc arrangements suitable for transferring the aluminium fluoride-trihydrate from the uppermost heated disc furnace to the lowermost heated disc surfaces.
Figure 3:
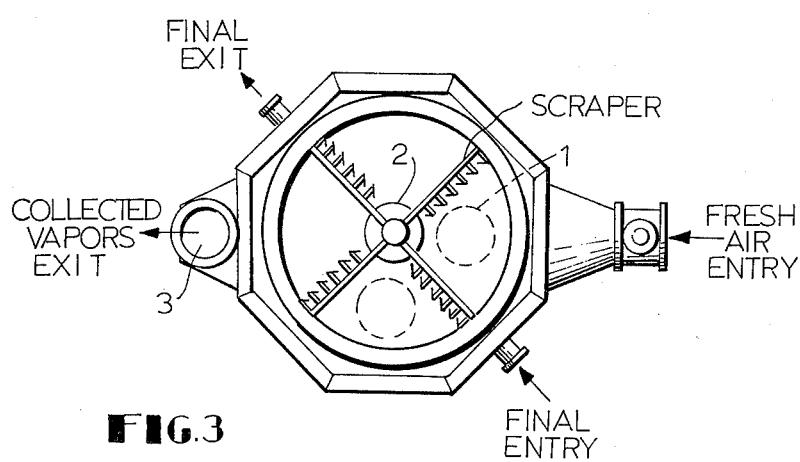
FIG. 3 is a top view of the apparatus with the cover removed to show the scraper means for mechanically moving the aluminum trifluoride successively from the uppermost heated disc surface to the lowermost heated disc surface and also shows the hot air entry as well as the collected vapors exit.

As can be seen from the drawings, the $AlF_3$ trihydrate is introduced in the opening 1 onto the uppermost heated disc, wherein it is mechanically moved from one disc layer to each succeeding lower disc layer by means of a scraper, wherein the finally dehydrated product is recovered through the exit 2. During this operation, water vapor formed during each succeeding stage of dehydration, is continuously expelled through exit 3 by passing hot air, introduced through the entrance 4, over the discs through each stage of the operation.

Accordingly, the present invention provides a process for the dehydration of aluminium fluoride trihydrate, which comprises heating the hydrate in two dehydration sections, a first dehydration to a maximum water content of 10% by weight being carried out in the first section, which first dehydration is effected in a disc dryer with several discs in which the material is heated in several steps, over the course of 10 to 20 minutes, to a temperature of 190° to 220° C, the disc temperature being 240° to 280° C, whilst the water vapour formed is continuously expelled from the dehydration zone by a supply of hot air in an amount that the atmosphere above the aluminium fluoride material which is at a temperature of over 190° C, has a water content of at most 6% by weight and the water content in the collected vapours of all of the steps of the first dehydration section does not exceed 22% by weight, after which the material obtained in the first dehydration section after a total residence time of at most 30 minutes is lead to the second dehydration section, in which aluminium fluoride is substantially completely dehydrated in a fluidised bed at a temperature up to 600° C. The second dehydration step in a fluidised bed is carried out under conventional conditions. The disc dryer may have per example 5 to 35 discs, preferably 5 to 30 discs, whereby the number of discs increases with the capacity of the dryer. In practice, between one to two thirds of the discs and the product to be dehydrated reaches the wanted temperature of 190° to 220° C. therefore the number of heating steps is approximately two thirds of the number of the discs. Per example in a disc dryer with 5 discs the temperature is reached on the third disc and therefore 3 heating steps exist.

The preferred objective will be a water vapour concentration of 10 to 14 percent because in that case the amount of air may be distributed uniformly over all the discs, and this is technically advantageous. As a result, the incorporation of complicated measuring devices and distribution devices for the hot air used for flushing may be dispensed with.

In the case of particularly large drying installations it may be more advantageous, as a result of the construction of the disc dryer, to increase the water vapour content in the collected vapours to 22% by weight, for economic reasons, but here the 22% represents a maximum value.

In practice, a water vapour content of between 17 and 20% by weight with such dryers is considered appropriate.

Admittedly, such a procedure requires a different distribution of the hot air used for flushing above the disc in a manner that discs with products of higher temperatures are supplied with a higher amount of air than the others. In this manner it is assured that the proportion of water vapour in the atmosphere above the product heated to at least 190° C should not rise above 6% by weight.

In order to prevent possible access of moist air from the upper discs to the sensitive product, it is advisable to incorporate dividing plates in the disc dryer. This makes it possible to prevent backflow and the aluminium fluoride, in the critical temperature range, is only swept by air containing less than 6% by weight of water.

Disc dryers of conventional construction, which in most cases consist of several discs arranged in series, which the material passes successively, are suitable for carrying out the process according to the invention. Such a disc dryer is shown in the drawing. At the same time heating to a temperature of 190° to 220° C may be carried out very effectively in several temperature steps. This stepwise heating is very important to the success of the process according to the invention since in that case the bulk of the water is released at a temperature below 190° C, at which a fairly high water vapour content in the atmosphere has no harmful influence. Only on reaching a temperature of 190° C is it necessary to ensure that the water vapour content above the material should not, as already stated, exceed 6% by weight. Appropriately, the introduced amount of the material to be calcined and the residence time in the individual steps of the disc dryer are so chosen, within the limits of the total dwell time of at most 30 minutes, that on reaching a product temperature of 190° C the material retains only 12% by weight of water. The maximum water vapour concentration of 6% above this material may then be achieved without supplying uneconomically large amounts of air, and above all also if, as is technically to be preferred, the amount of air is uniformly distributed over all the discs. The maximum tolerated water vapour content of 22 percent in the gases which leave is a value found by experience, and if this is maintained and the remaining temperatures and time date are observed, satisfactory running is still possible.

The $AlF_3$ obtained in the manner according to the invention, which has a residual water content of less than 10% by weight, may then be dehydrated substantially completely in the usual manner in a fluidised bed reactor for example a reactor according to U.S. Pat. No. 3,606,283 care having to be taken here that the dehydration temperature should be reached within a few seconds.

The performance of the process according to the invention will be illustrated in more detail in the following Example.

EXAMPLE 48.8 kg of aluminium fluoride trihydrate with a total water content of 46% by weight was introduced hourly into a disc dryer heated with heat exchange oil and having 5 discs and a total heat exchange surface of 3.8 m². The temperature of the discs was 270° C and the water vapour was expelled by air at a temperature of 300° C, of which a total of 140 Nm³/hour was consumed, the air being uniformly distributed over all 5 discs. The water content in the collected gases which issued was 9.4% by weight. After 15 minutes residence time in a dryer the product had reached the final temperature of 190° C and was on the third disc. The atmosphere above it contained 4.8% by weight of water vapour.

At a total residence time of 30 minutes, 29.4 kg of aluminium fluoride containing 8.7% of water was obtained hourly.

The product thus obtained was subsequently substantially completely dehydrated in a fluidised bed furnace, heated by means of radiant sleeves, at a temperature of 550° C. 26.8 kg of product containing 97.5% of $AlF_3$ was obtained hourly.

What we claim is:

1. In a process for dehydrating aluminium fluoride-trihydrate in two sections, whereby the aluminium fluoride-trihydrate is introduced into a first section where it is partially dehydrated and then into a second dehydration section in which it is substantially dehydrated in a fluidized bed at a temperature of up to 600° C, the improvement which comprises dehydrating the aluminium fluoride-trihydrate to an aluminium fluoride material having a maximum content of 10% in a first dehydrating section by mechanically moving the aluminium fluoride-trihydrate successively over several heated horizontal annular shaped surfaces spaced vertically apart one above the other in such a manner that the aluminum fluoride is moved over the uppermost surface and then to the next one below it until the lowermost heating surface is reached, by which the aluminum fluoride material is heated in several steps at a temperature of 190° C to 220° C over the course of 10 to 20 minutes within various heating zones formed by the annular surfaces heated at temperatures of 240° C to 280° C, while water vapor formed above the heated surfaces in the various heating zones is continuously expelled from the atmosphere above the heating surfaces by passing hot air through each step of said first hydration section in streams parallel to the heated surface in such amounts that the amount of water in the atmosphere above the aluminum fluoride, which has a temperature over 190° C, has a water content of at most 6% by weight and the water content in the collected vapors of all of the steps of the first dehydration section does not exceed 22% by weight and then transferring the material to a second dehydration section after it has been in the first dehydration section for a residence time not exceeding 30 minutes.

2. A process according to claim 1, in which the hot air is distributed substantially uniformly over the steps of heating within the first dehydration section and the proportion of water vapor in the collected vapors is 10 to 14% by weight.

3. A process according to claim 1, in which the hot air is non-uniformly distributed over the steps of heating within the first dehydration section in a manner such that the higher temperature aluminum fluoride material is supplied with a higher amount of the hot air, whereby the proportion of water vapor in the collected vapors is between 15 and 20% by weight.

* * * * *